US010760610B2

(12) United States Patent
Oscarson et al.

(10) Patent No.: US 10,760,610 B2
(45) Date of Patent: Sep. 1, 2020

(54) FASTENER

(71) Applicant: Bulten AB, Gothenburg (SE)

(72) Inventors: Henrik Oscarson, Hallstahammar (SE); Anders Norman, Hallstahammar (SE); Anders Andersson, Hallstahammar (SE)

(73) Assignee: BULTEN AB (SE)

( * ) Notice: Subject to any disclaimer, the term of this patent is extended or adjusted under 35 U.S.C. 154(b) by 282 days.

(21) Appl. No.: 15/736,167

(22) PCT Filed: Jun. 16, 2016

(86) PCT No.: PCT/EP2016/063934
§ 371 (c)(1),
(2) Date: Dec. 13, 2017

(87) PCT Pub. No.: WO2016/202943
PCT Pub. Date: Dec. 22, 2016

(65) Prior Publication Data
US 2018/0156262 A1 Jun. 7, 2018

(30) Foreign Application Priority Data

Jun. 18, 2015 (EP) ..................................... 15172719

(51) Int. Cl.
*F16B 37/14* (2006.01)
*B60B 3/16* (2006.01)
*B60B 7/06* (2006.01)

(52) U.S. Cl.
CPC .............. *F16B 37/14* (2013.01); *B60B 3/165* (2013.01); *B60B 7/068* (2013.01)

(58) Field of Classification Search
USPC ........................ 411/372.6, 375, 346, 373, 337
See application file for complete search history.

(56) References Cited

U.S. PATENT DOCUMENTS 1,152,960 A * 9/1915 Moloney ................. F16B 37/14
411/373
1,381,587 A * 6/1921 Noble ..................... F16B 37/14
411/429

(Continued)

FOREIGN PATENT DOCUMENTS

EP 1422427 A1 5/2004
FR 2386722 A1 11/1978

(Continued)

OTHER PUBLICATIONS

International Search Report and Written Opinion for corresponding International Application No. PCT/EP2016/063934 dated Sep. 9, 2016.

(Continued)

*Primary Examiner* — Gary W Estremsky
(74) *Attorney, Agent, or Firm* — Tarolli, Sundheim, Covell & Tummino LLP

(57) ABSTRACT

The present invention relates to a fastener, such as a bolt or a nut, for fastening a wheel to a vehicle, comprising: a body comprising: a cap receiving portion, a threaded portion and a central axis; and a cap, arranged to be received by and cover said cap receiving portion characterized in that said cap receiving portion comprises a recess or a protrusion against which said cap can be deformed, or has been deformed, such that said cap forms a mutual matching protrusion or recess, wherein said recess or protrusion of said cap receiving portion has a longitudinal extension essentially parallel to said central axis. The present invention also relates to a method for assembling a fastener.

13 Claims, 6 Drawing Sheets

(56) References Cited

U.S. PATENT DOCUMENTS

| | | | | |
|---|---|---|---|---|
| 1,433,783 | A | * | 10/1922 | Carr ........................ F16B 37/14 24/694 |
| 3,134,290 | A | * | 5/1964 | Jentoft .................. F16B 43/001 411/377 |
| 3,693,495 | A | * | 9/1972 | Wagner ................. F16B 23/003 411/377 |
| 3,897,712 | A | * | 8/1975 | Black .................... F16B 23/003 411/373 |
| 4,154,138 | A | * | 5/1979 | Melone .................. F16B 37/14 411/373 |
| 5,350,266 | A | * | 9/1994 | Espey ...................... B62J 23/00 403/375 |
| 5,370,486 | A | | 12/1994 | Plummer |
| 5,772,377 | A | | 6/1998 | Bydalek |
| 8,109,707 | B2 | * | 2/2012 | Winker ................... A47G 3/00 411/375 |
| 8,936,423 | B2 | * | 1/2015 | Davis ..................... F16B 23/00 411/377 |
| 2002/0098059 | A1 | * | 7/2002 | Schmidt ................. F16B 37/14 411/399 |
| 2003/0068212 | A1 | | 4/2003 | Wilson |
| 2012/0321412 | A1 | * | 12/2012 | Lonn ...................... F16B 37/14 411/431 |
| 2013/0149071 | A1 | * | 6/2013 | Davis .................... F16B 1/0071 411/402 |

FOREIGN PATENT DOCUMENTS

| | | |
|---|---|---|
| JP | S568918 A | 1/1981 |
| KR | 20070012041 A | 1/2007 |
| KR | 20110124597 A | 11/2011 |

OTHER PUBLICATIONS

Extended European Search Report for corresponding EP Application No. 15172719.5 dated Apr. 1, 2016.

* cited by examiner

FASTENER

RELATED APPLICATIONS

The present invention is a U.S. National Stage under 35 USC 371 patent application, claiming priority to Serial No. PCT/EP2016/063934, filed on 16 Jun. 2016; which claims priority of EP 15172719.5, filed on 18 Jun. 2015, the entirety of both of which are incorporated herein by reference.

FIELD OF THE INVENTION

The present invention relates to a fastener, such as a bolt or a nut, for fastening a wheel to a vehicle, comprising a body and a cap. The present invention also relates to a method of assembling a fastener.

BACKGROUND OF THE INVENTION

A fastener such as a nut or a bolt comprising a cap receiving portion and a cap is known in the prior art. The fasteners are often used for fastening for instance wheels to a vehicle. The cap of the fastener then may have a decorative function.

Often the cap is arranged to cover the cap receiving portion of a body of the fastener. The cap and cap receiving portion often comprise a flange having a circular portion. The cap is often held in place by being interference fitted, due to the cap having an inner diameter of the circular portion being smaller than the outer diameter of a mating circular portion of the cap receiving portion. If the difference in diameter between the two circular portions is too large the cap may not be securely fastened to the cap receiving portion, or it may be impossible to get the cap to fit to the circular portion of the cap receiving portion. The play between the cap and cap receiving portion must therefore be checked, and the tolerances of the cap and cap receiving portion must be controlled, during the manufacturing to ensure that the the play is within specifications which may increase costs for manufacturing the fastener. Such additional manufacturing may include lathing or turning of the fastener such that the correct play between circular portions, of the cap and body of the fastener, is achieved.

Further disadvantages with current fasteners is that it may be difficult to properly align, fit a seat of the cap to the cap receiving portion of the body of the fastener. This increases the risk of the cap falling off during application.

Hence, there is a need for a fastener comprising a cap which alleviates some or all of the above mentioned disadvantages.

SUMMARY OF THE INVENTION

The object of the present invention is to provide a fastener that at least partly overcomes the above issues.

The invention is based on the insight that by providing a fastener, such as a bolt, for fastening a wheel to a vehicle: comprising a cap receiving portion and a cap, wherein the cap and the cap receiving portion comprises a recess and a matching protrusion, wherein the recess and the protrusion have a longitudinal extension essentially parallel to a central axis, a secure fastening of the cap to the cap receiving portion is achieved. The has further realized that an improved fastener comprising a cap is obtained when the cap is being shaped, by being plastically deformed, after the shape of the cap receiving portion of the fastener.

According to a first aspect, the invention relates to a fastener, such as a bolt or a nut, for fastening a wheel to a vehicle, comprising:

a body comprising: a cap receiving portion, a threaded portion and a central axis; and a cap, arranged to be received by and cover said cap receiving portion characterized in that said cap receiving portion comprises a recess or a protrusion against which said cap can be deformed, or has been deformed, such that said cap forms a mutual matching protrusion or recess, wherein said recess or protrusion of said cap receiving portion has a longitudinal extension essentially parallel to said central axis. In some embodiments the fastener is in the shape of a nut and in other embodiments the fastener is in the shape of a bolt. The cap is adapted to be used with both the nut and the bolt type of fastener. It may also be possible to use the cap for additional types of fasteners. It is advantageous when the cap can be used for capping different types of fastener. A manufacturer need only manufacture one type of cap which can be used with many different types of fasteners. This increases the number of possible applications where a fastener comprising the cap may be used. The fastener comprises a body: comprising a cap receiving portion, a threaded portion and a central axis. The fastener may be seen as revolving around the central axis. Thus, the fastener may also be seen as being rotationally symmetric around the same central axis. The threaded portion may be an internal or an external threaded portion. Hence the fastener may be of a nut or bolt type. For the nut type the threaded portion would be an internal threaded portion, while for the bolt type it would be an external threaded portion. The cap receiving portion is adapted to be capped, covered or at least partly covered, by the cap.

The body of the fastener may be manufactured by being cold forged, and the threads may be manufactured by being rolled. The body of the faster may also be manufactured by hot forging methods or by being manufactured by subtractive and/or additive manufacturing methods.

The cap is held in place by the cap receiving portion comprising at least a recess or a protrusion against which the cap can be shaped. The cap may be shaped/deformed against the cap receiving portion after the cap receiving portion has been covered by the cap. This may be done by plastically deforming the cap, by pressing it such that at least parts of the cap match the recesses or protrusions of the cap receiving portion of the body of the fastener. The cap receiving portion is then used as a counterhold or anvil wherein an embossment is created in the cap between a pressing member, pressing and plastically deforming the cap against the cap receiving portion. This creates a mutually matching protrusion or recess in the cap. It is advantageous that the recess or protrusion of the cap receiving portion has a longitudinal extension essentially parallel to the central axis since said recess or protrusion will, together with the formed mutually matching protusion or recess of the cap, secure the cap from being moved in relation to the cap receiving portion of the body of the fastener along the central axis, and along a circumferential direction around the central axis. By shaping parts of the cap around the cap receiving portion a good fit between the cap and the cap receiving portion is ensured. This enables the fastener to be manufactured cost efficiently. It also minimize problems with the cap falling off due to poor fit between the cap and cap receiving portion which may be related to manufacturing methods used for manufacturing prior art capped fasteners. Hence one recess and matching protrusion may secure the cap to the cap receiving portion. However, more than one recess and matching protrusion may further increase the securing of the cap to the cap receiving portion of the fastener. When the cap receiving portion comprises a protrusion, extending outwardly from the surface of the cap receiving portion, the cap may be deformed around the protrusion, securing the cap to the cap receiving portion of the body of the fastener.

It is advantageous to form a matching protrusion or recess in the cap plastically onto the recess or protrusion in the cap receiving portion. The recess or protrusion in the cap receiving portion is then used as a counterhold, to the tool plastically shaping the cap, by the cap being pressed between the pressing and shaping tool and the cap receiving portion being used as a counterhold. This ensures a nice fit between the cap and cap receiving portion. By forming one part after the other manufacturing of the cap and the body of the fastener can be made less costly.

The fastener may comprise a tool engaging portion for a tool to engage when the fastener is being screwed in or out, e.g. when mounting or dismounting a wheel of a vehicle. The fastener may be made into having different tool engaging portions for being engaged by tools having different tool engaging interfaces. Such tool engaging portions may be of hexagonal type, such as an allen key, both for internal or external engagement.

The cap and the body of the fastener may be made from different materials. The body of the fastener may be made from a high strength steel while the cap may be made from a material having a lower strength and different properties than the high strength steel. The cap may be made from a stainless steel or an aluminium alloy.

According to an exemplary embodiment of the present invention one of said cap and said cap receiving portion comprises at least one guiding track and wherein the other of said one of said cap and said cap receiving portion comprises a mating guiding projection. The guiding projections and the guiding tracks help to align the cap to the cap receiving portion when the cap receiving portion is being capped. The guiding tracks and the guiding projections also help to secure the cap to the cap receiving portion along a circumferential direction around the central axis. The guiding projections and the guiding tracks may be formed such that the guiding tracks and guiding projections partly secure the cap to the cap receiving portion. By partly secured the cap may be secured temporarily before the manufacturing step whereby mutual matching protrusions or recesses are formed in the cap. The guiding projection may have a longitudinal extension essentially the same length as the guiding track. However the guiding projection may have a longitudinal extension being shorter or longer than the length of the longitudinal extension of the guiding track. The shape of the guiding projection may hence, be rectangular. However, it may also have an essentially round shape or another shape which can be engaged by the guiding track such that it may guide the cap, and partly secure it, to the cap receiving portion of the body of the fastener. The guiding tracks and guiding projections may also help with securing the cap to the cap receiving portion, in a circumferential direction around the central axis. The guiding track and guiding projection may also increase the rigidity of the cap such that it is not as easily deformed as a cap not having guiding tracks and guiding projections. Such deformations may occur when a tool engages the tool engaging portion of the cap of the fastener. With each fastening and loosening of a fastener, by a tool engaging the tool engaging portion, small deformation may occur in the cap when the cap is being forced to rotate by the tool. The deformations may lead to the cap to become loose and possibly risk falling off the from the cap receiving portion of the fastener.

According to an exemplary embodiment of the present invention, said recess of said at least one of said cap and said cap receiving portion comprises a groove having a longitudinal extension parallel to said central axis and an end stop, said end stop arranged adjacent a trailing surface of said body of said fastener. The end stop may be manufactured by shearing, a portion of the trailing surface of the body of the fastener, in a direction from the trailing surface towards the threaded portion of the fastener, such that a protrusion is formed in the groove. This enables the recess to be manufactured from a groove in a simple and cost efficient way. When the cap receiving portion comprises a protrusion, the cap may be arranged with the end stop adjacent a leading surface of the cap. After the cap has been arranged to the cap receiving portion of the fastener, the end stop may be formed by shaping a portion of the cap, by plastically deforming it, against the protrusion of the cap receiving portion. This ensures that the cap is secured to the cap receiving portion of the fastener by the end stop preventing the cap from falling.

The end stop may be be manufactured by using an additive manufacturing where material is added to the groove of the cap receiving portion. Such method method may e.g. be welding. The end stop may be arranged adjacent a trailing surface of the body of the fastener but may also form a part of the trailing surface, such a being an overhang of the trailing surface. The end stop may also be arranged at a distance from the trailing surface of the body of the fastener, depending on the dimensions of the cap receiving portion. When the cap receiving portion comprises a protrusion and the cap comprises a recess the end stop may be arranged on the cap, adjacent the flange portion of the cap.

The end stop may further be manufactured by material adjacent the grooves, on one or both sides, is pressed and formed such that the groove, partly collapses, and a recess is formed comprising a an end stop. It may also be possible to manufacture recesses in the same manufacturing step, where the guiding grooves are being cold formed, by cold forming the recesses from one of the surface of the hexagonal tool engaging portion. The recesses may also be formed by subtractive manufacturing methods such as milling.

An outer surface, in a radial direction from the central axis, may be level with a surface of the tool engaging portion. The end stop may have a longitudinal extension, parallel to the longitudinal extension of the recess, being equal in length, or half the length, of the longitudinal extension of the recess. The width of the end stop, in a circumferential direction, may be larger than the width of a recess. The end stop may also be wedge or gusset shaped or having a semi-spherical shape.

When the cap receiving portion comprises a groove, the groove may be a guiding track. This enables the fastener to be partially manufactured into comprising only guiding tracks. Prior to capping the cap receiving portion, the recesses can be manufactured by some of the guiding tracks being arranged with end stops by shearing a portion of the trailing surface of the body of the fastener.

According to an exemplary embodiment of the present invention the at least one guiding track and said at least one guiding projection has a longitudinal extension, essentially parallel to the central axis. Having the guiding projections and guiding tracks extending in a longitudinal direction essentially parallel to the central axis enables the cap to be arranged on the cap receiving portion of the body of the fastener, in a simple manner. The guiding track and projection help to secure the cap to the body of the fastener in a direction along a circumferential direction around the central axis of the fastener. The guiding track and projections also temporarily secures the cap to the cap receiving portion of the body of the fastener before forming the protrusion or recesses.

According to an exemplary embodiment of the present invention said recess or protrusion and said guiding track or guiding projection are alternately arranged on said cap receiving portion. Alternately arranging the recesses or protrusions on the one hand, and the guiding tracks or guiding projections on the other hand, on said cap receiving portion enables for a cost efficient method of securing the cap to the cap receiving portion by distributing or spreading the securing forces to more than one recess or protrusion. For instance, the cap receiving portion may be in the form of a hexagonal shape having six side surfaces, wherein every other surface of the six side surfaces is provided with a recess, while the remaining three surfaces are provided with guiding tracks. The recesses and guiding tracks in the above example may be substituted by protrusions and guiding projections. The recesses or protrusions may be arranged on opposing sides of the cap receiving portion. The recesses and protrusions may also be arranged in pairs, wherein two recesses or protrusions are arranged in between two pairs of guiding tracks or guiding projections. Depending on how secure the cap is to be to the cap receiving portion, more or fewer recesses or protrusion and guiding tracks or guiding projections may be arranged to the cap receiving portion.

The cap receiving portion may also be in the form of a hexagonal shape having six side surfaces, wherein every other surface of the six side surfaces is provided with a recess, while the remaining three surfaces are provided with guiding tracks. The recesses and guiding tracks in the above example may be substituted by protrusions and guiding projections. The recesses may also be substituted by protrusions and the guiding tracks may be substituted by guiding projections, in various combinations.

According to an exemplary embodiment of the present invention a surface of said cap (5) comprises a tool engaging portion (6, 6', 6") adapted to be engaged by a tool when fastening and loosening said fastener. The tool engaging portion may be a hex- or hex-socket-type, such as an allen key. The tool engaging portion may also comprise other tool engaging interfaces such as torx, square or other tool engaging interfaces available to the skilled person and suitable for the application. The tool engaging portion may be an interior or exterior type of tool engaging portion. The fastener may be an internal socket type fastener, wherein the tool engaging portion is arranged on internal surfaces of the fastener.

According to an exemplary embodiment of the present invention the cap receiving portion has a hexagonal cross-section, in a plane perpendicular to said central axis. The plane being perpendicular to the central axis of the fastener may also be defined by the central axis of the fastener. The central axis may be used to define a normal to the plane.

According to an exemplary embodiment of the present invention the cap has a hexagonal cross-section, in a plane perpendicular to said central axis.

According to an exemplary embodiment of the present invention the cap receiving portion comprises the same number of: recesses or protrusions; and guiding tracks or guiding projections. Having the cap and cap receiving portion comprising a hexagonal cross-section being arranged with the same number of number of recesses or protrusions; and guiding tracks and guiding projections; ensure a secure fit between the cap and cap receiving portion. By having the cap comprising a hexagonal cross-section standard tools may be used for engaging the fastener.

According to an exemplary embodiment of the present invention the cap is made from a non-corrosive material such as stainless steel. Using a non-corrosive material is advantageous since the cap will be prevented from corroding or rusting. Stainless steel may be used as well as other metallic materials. A polymer such as a plastic may also be used for capping the fastener.

According to an exemplary embodiment of the present invention the cap is made from a first material plated by a second material. Manufacturing the cap from two materials by plating a first material with a second material enables the cap to be manufactured in a cost efficient way. A low cost material may be used for the core portion of the cap. This enables cheap sheet metal to be used for the core of the cap. More expensive materials can then be used for the aesthetic properties of the cap by plating the first material with a second material. Plating can be done by chemical, electrical or electrochemical methods. It is also possible to replace the plating manufacturing methods by coating methods with for instance a polyurethane coating. The fastener may also be arranged with a filling material arranged between the cap and the cap receiving portion, further securing the cap to the cap receiving portion. Such a filler may also be used for reducing vibrations between the cap and the cap receiving portion of the body of the fastener. Such a material may be a thermosetting polymer or polymer with some elastomeric properties.

According to an exemplary embodiment of the present invention the fastener is an internal socket type fastener and wherein said recess or protrusion, is arranged on an outer surface of said cap. Arranging the recesses or protrusions on an outer surface of the body of the fastener wherein the surface is separate from the tool engaging surface is advantageous when the tool engaging portion is small. This enables the securing of the cap to the cap receiving portion to be separated from the tool engaging portion of the fastener. For instance when the cap is arranged with an internal hexagonal socket tool engaging portion having a small dimension, such that it is difficult for a tool to access and plastically deform the surface of the cap, the securing recess or protrusion of the cap receiving portion may be moved to an outer surface surface of the fastener.

According to a second aspect of the present invention, the invention relates to a method of assembling a fastener, said fastener comprising:

a body comprising: a cap receiving portion, a threaded portion, a central axis; and a cap, said method of assembling said fastener comprising the steps of:

capping said body, by arranging said cap to said cap receiving portion, such that said cap covers said body, and deforming said cap such that said cap forms a recess, when said cap receiving portion comprises a protrusion, so that said formed recess of said cap matches said protrusion of said cap receiving portion; or deforming said cap such that said cap forms a protrusion, when the cap receiving portion comprises a recess, so that said formed protrusion matches said recess of said cap receiving portion, wherein said recess or protrusion of said cap receiving portion has a longitudinal extension parallel to said central axis.

The cap may cover, at least partly, the body of the fastener when the fastener is a bolt type fastener or a nut type fastener. The fastener may also cover essentially the whole of the body of the fastener when the fastener is a nut type fastener. The cap may also cover the whole or parts of the body of a fastener when the fastener is an additional type of fasteners not being of a nut or bolt type fastener.

Capping the body of the fastener by arranging the cap to the cap receiving portion is made by aligning the cap such that the cap receiving portion and the cap shares a central axis. When the cap receiving portion comprises guiding tracks, the cap is rotated such that guiding projections are aligned with the guiding tracks. The cap is thereafter moved along the central axis towards the cap receiving portion such that the cap is mated with the cap receiving portion and, at least partly or fully, covers the body of the fastener. After the step of capping the body the cap is deformed such that said cap forms a recess, when said cap receiving portion comprises a protrusion, said formed recess of said cap matching said protrusion of said cap receiving portion. However, if the cap receiving portion comprises a recess, the cap is deformed such that said cap forms a protrusion, said formed protrusion matching said recess of said cap receiving portion, wherein said recess or protrusion comprises a longitudinal extension parallel to said central axis. Such a deformation may be done by mechanically crimping, or compressing one, some or all surfaces of the cap such that protrusions or recesses, matching the recesses or protrusions in the cap receiving portion, are formed. This step is a cost efficient way of securing the cap to the cap receiving portion since a part of the pressing, the counterhold to the pressing portion of a tool, is the cap receiving portion of the body of the fastener. This also ensures that each cap is securely fastened to the cap receiving portion, even if the exact dimensions of each body of a fastener may differ somewhat. Such differences may depend on tool setup or that fasteners are from different manufacturers or manufacturing batches. Since the recesses or protrusions of each cap is formed after the cap receiving portion the result is a secure fastening between the cap and cap receiving portions.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawings, where the same reference numerals will be used for similar elements, wherein:

FIG. 4b shows an exploded view of the fastener in FIG. 4a.

All the figures are highly schematic, not necessarily to scale, and they show only parts which are necessary in order to elucidate the invention, other parts being omitted or merely suggested.

DETAILED DESCRIPTION OF THE DRAWINGS

Currently preferred embodiments of the present invention will now be described in more detail, with reference to the accompanying drawings.

Figure 1:
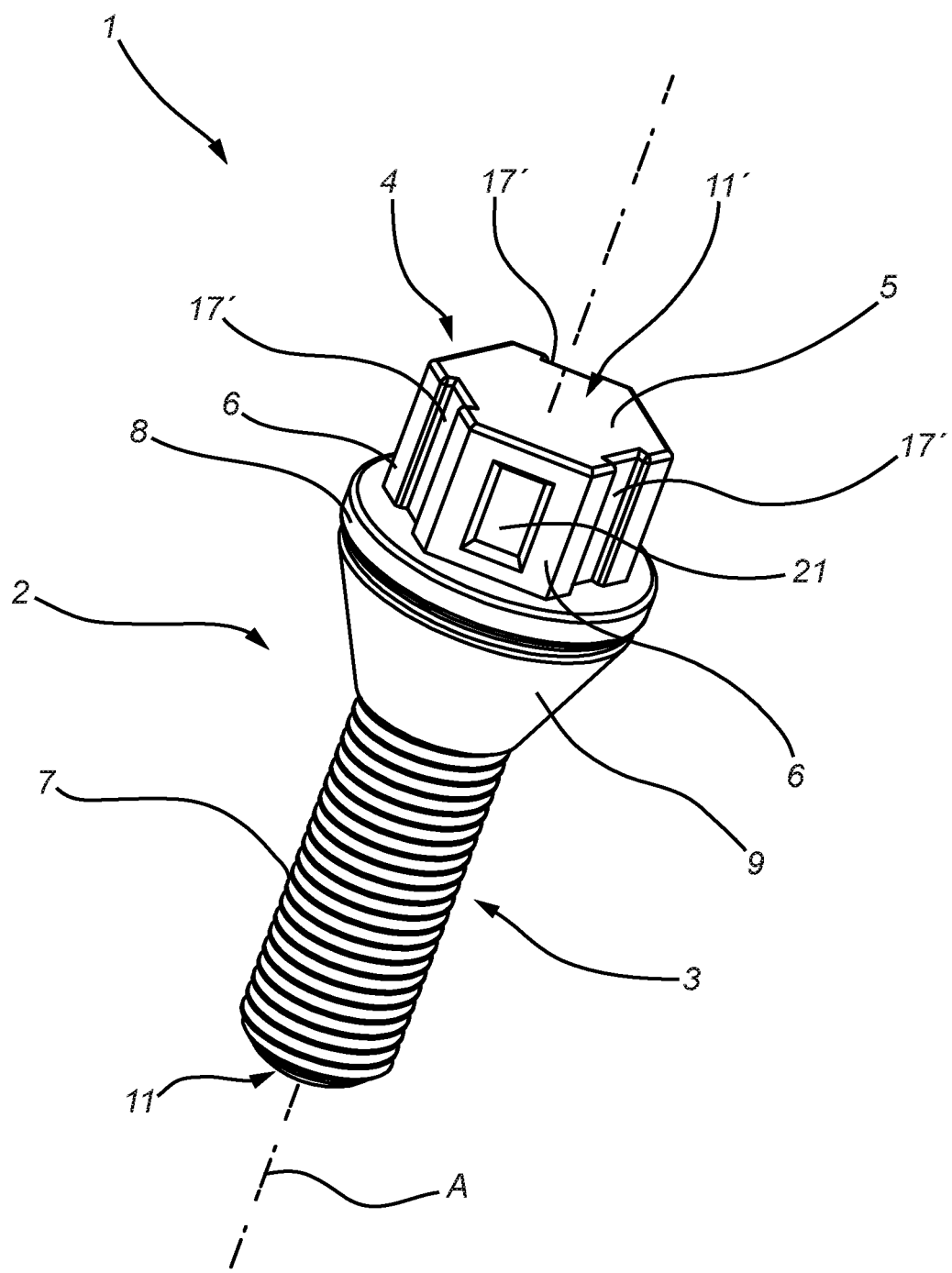
FIG. 1 shows a fastener comprising a body, a cone-shaped washer and a cap.

FIGS. 1-3b show a fastener 1, for fastening e.g. a wheel to a vehicle. However, the fastener may be used for fastening other items as well. The fastener 1 in FIG. 1 is in the shape of a bolt having a threaded portion 3 comprising threads 7. The fastener is arranged revolving around a central axis A. The threaded portion 3 has a cylindrical form. The bolt is adapted for being screwed into a bore or hole having matching threads. The fastener comprises a body 2 comprising a head portion 4 and said cylindrical threaded portion 3.

Between the head portion 4 and the cylindrical threaded portion 3 is a flange portion 8 having a cylindrical shape with a diameter larger than the cylindrical threaded portion 3 of the fastener 1. The flange portion 8 will be further described in relation to FIG. 2.

Figure 2:
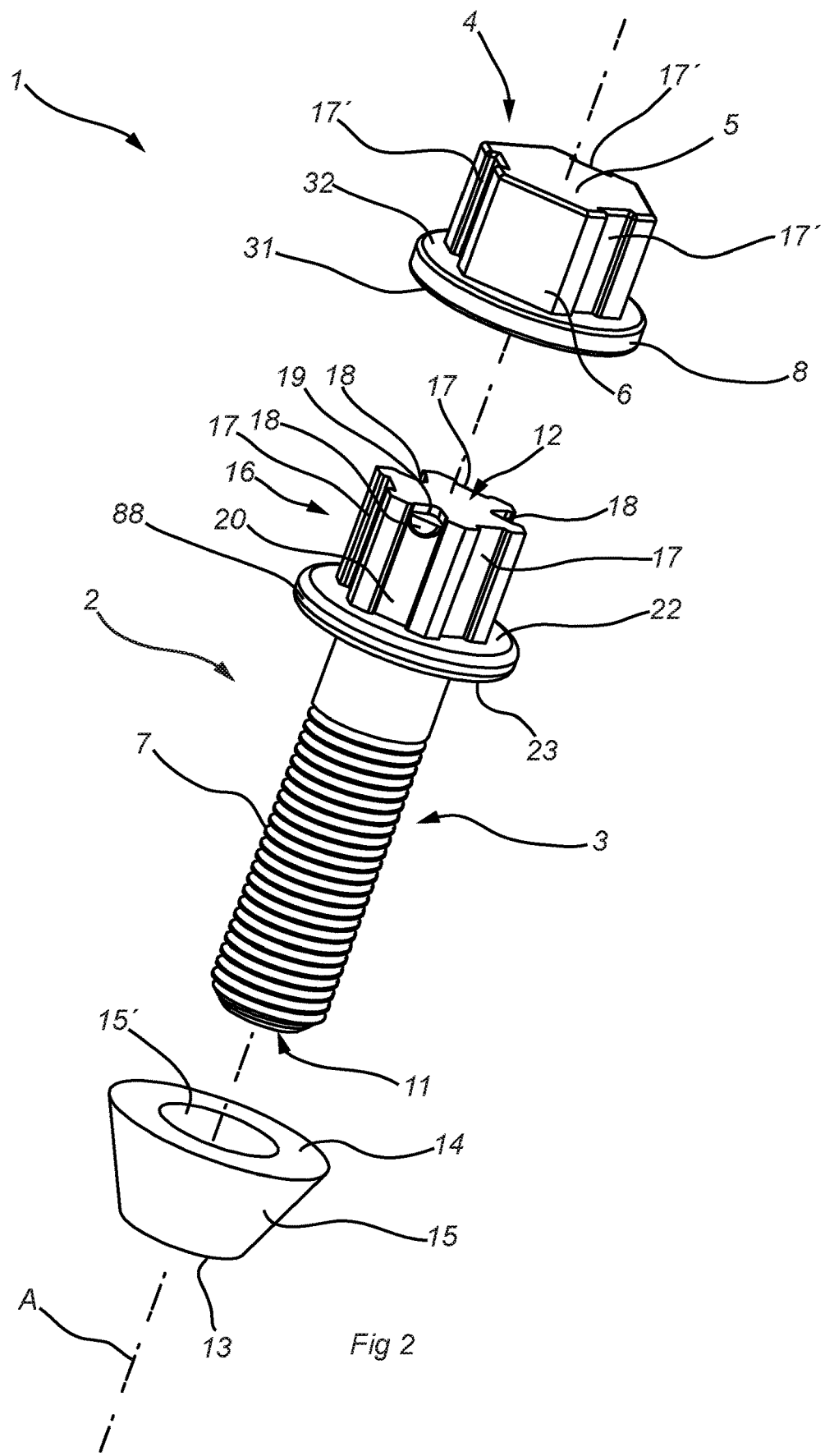
FIG. 2 shows an exploded view of the fastener in FIG. 1, with the washer removed.

The head portion 4 in turn comprises a cap 5 covering a cap receiving portion (Seen in FIG. 2). The head portion 4 of the fastener comprises a tool engaging portion 6, arranged for a tool (not shown) to engage the fastener 1 when the fastener 1 is being screwed into or out of a threaded hole (not shown). The cap 5 of the fastener has an essentially hexagonal cross-section. This is shown in FIG. 3b. The cylindrical portion 3 of the fastener has a cylindrical cross-section which is partly threaded by threads 7. The cylindrical portion 3 of the fastener may also be fully threaded in that substantially the whole of the cylindrical portion 3 comprises threads 7. The fastener 1 may be arranged with a washer 9 depending on the application of the fastener 1. The washer 9 has a conical shape adapted to, when in use, be in contact with a corresponding surface of an item arranged to be fastened. If the corresponding surface would have a different shape, the shape of the washer would be adapted to such a different shape. In some exemplary embodiments the washer may be omitted. In other exemplary embodiments, instead of the fastener being provided with a separate washer, the bolt as such may have an integral portion which is tapered and/or of increased diameter and which is adapted to be in contact with a corresponding surface of an item to be fastened.

The fastener 1 comprises a leading end 11 and a trailing end 11'. The leading end 11 is the end to be inserted to, or screwed into, a threaded hole when the fastener 1 is used to secure and item and an opposite arranged trailing end 11'. The cap 5 comprises protrusions 21, protruding in a direction from the surface of the cap 5 inwards towards the central axis A of the fastener 1. The protrusions 121 are illustrated as having a rectangular shape with an longitudinal extension in a direction parallel to the central axis A. However, non-rectangular shaped are also conceivable, depending on the counterhold in the cap receiving portion against which they are formed. The fastener 1 comprises three protrusions 121, arranged on three of the six hexagonal surfaces of the tool engaging portion 6. The fastener 1 further comprises three guiding projections 17' arranged on the three remaining surfaces of hexagonal surfaces, the surfaces not comprising protrusions 121, of the tool engaging portion 6 of the head portion 4 of the fastener 1. The guiding projections 17' comprises a protrusion protruding in a direction from the surface of the cap 5 inwards towards the central axis A of the fastener 1. The guiding projections 17' extend in direction parallel to the central axis A.

FIG. 2 shows an exploded view of the fastener 1, in FIG. 1, prior to being assembled. The body 2 of the fastener 1 comprises a cap receiving portion 16, and a cylindrical threaded portion 3. The cap receiving portion 16 is arranged to be covered by the cap 5 hence the dimensions of the cap 5 and the cap receiving portion 16 are matching. Separating the cap receiving portion 16 from the cylindrical threaded portion 3 is a cylindrically shaped flange 88 arranged to be matching the flange portion 8 of the cap 5. The diameter of the flange 88 is larger than the diameter of the cylindrical threaded portion 3 of the fastener 1. The diameter of the flange 88 is smaller than the diameter of the flange portion 8 of the cap 5. The flange 88 has a flange leading surface 21 and a flange trailing surface 22. The flange leading surface 21 is facing in a direction towards the leading surface 11 of the fastener 1, leading as in relation to a hole into which the fastener is to be threaded. The central axis, A, defines the longitudinal direction of the fastener 1. The washer 9 has a conical shape with a washer leading surface 13 and a washer trailing surface 14. The washer trailing surface 14 is arranged to be in contact with the flange leading surface 21 of the fastener 1. The washer leading surface 13 is arranged opposite the washer trailing surface 14 of the washer 9. Connecting the washer leading surface 13 with the washer trailing surface 14 is an outer contact surface 15 and an inner surface 15'. When the fastener 1 is engaging with and securing for instance a wheel of a vehicle or another item the larger area of the outer contact surface 15 being due to the conical shape of the washer, helps with distributing the axial forces from the fastener 1 to a matching conical seat of the wheel rim or item to be fastened (not shown). The washer 9 is thus pressed between the seat of the wheel rim or item to be fastened and the flange leading surface 21 of the cylindrical shaped flange 88 of the body 2 of the fastener 1. The body 2 of the fastener 1 comprises a trailing surface 12 arranged on an opposite end to the leading end 11 of the fastener 1.

The cap receiving portion 16 has a cross-section being hexagonal wherein three of the surfaces of the cap receiving portion 16 comprises guiding tracks 17 arranged as grooves extending in a direction from the flange 88 to the trailing surface 12 of the body 2 of the fastener 1. The cap receiving portion 16 further comprises three recesses 20, each recess being defined as a groove with a longitudinal extension along the central axis A of the body 2 of the fastener 1, and by the flange 88 and an end stop 18. The end stops 18 are arranged adjacent the trailing surface 12 of the body 2 of the fastener 1. Adjacent the end stops 18, arranged in the trailing surface 12, are trailing end recesses 19. The trailing end recesses 19 are created when the end stops 18 are manufactured. The end stops 18 are manufactured by partly shearing a portion of the trailing surface 12 of the body 2 of the fastener 1, thereby collapsing a portion of the trailing surface 12 in a direction towards the leading edge 11 of the fastener. The recesses 20 may thus be manufactured from a guiding track 17 by forming the end stop 18 by partly shearing a portion of the trailing surface 12 in a direction towards the flange 88 of the body 2 of the fastener 1. The recesses 20 are arranged to secure the cap 5 to the cap receiving portion 16 of the body 2 of the fastener 1.

The cap 5 of the fastener 1 is made from a thin material such as a sheet metal. The cap 5 has an essentially hexagonal cross-section matching the shape of the cap receiving portion 16 of the body 2 of the fastener 1. The shape enables the cap to be arranged to cover the cap receiving portion 16. As already mentioned above, the cap 5 is arranged with guiding projections 17' matching the guiding tracks 17 of the cap receiving portion 16 of the body of the fastener. The guiding projections 17' are arranged internally of every other surface side of the the six-sided tool engaging surface 6 of the cap 5 (see FIG. 3b). The other three surface sides are flat or substantially flat in the initial state of the cap, before assembling of the fastener 1. When the cap 5 is to be arranged to cover the cap receiving portion 16, the cap 5 is guided and aligned such that each guiding projection 17' is received by a guiding track 17. When the cap 5 has become mounted/arranged to, and secured to the body 2 of the fastener 1, the body 2 of the fastener 1 may be described as being capped. The cap 5 is secured by deforming the three surfaces of the cap not being arranged with guiding ridges 17', such that the surfaces are shaped into protrusions 121, matching the shapes of the recesses 20 of the body 2 of the fastener 1. The shape of the protrusion 121 of the cap 5 can be seen in FIG. 1, wherein it protrudes inwardly from the side surface of the tool engaging portion 6 and towards the axis A. As seen in FIG. 1, although the protrusion 121 protrudes inwardly internally of the cap 5, from an external perspective, the protrusion will actually look like a depression in the tool engaging surface 6.

The shape of the guiding tracks 17 and the matching guiding projections 17', together with the shape of the recesses 20 and the protrusions 121, have the benefit that apart from securing the cap 5 efficiently to the body 2 of the fastener 1, normal hexagonal tools can be used for engaging the tool engaging portion 6 of the fastener 1. This enables the fastener 1 to be used with standard tools. The cylindrical flange portion 8 of the cap is arranged to engage and enclose at least a portion of the cylindrical flange 88 of the body 2 of the fastener 1. The cylindrical flange portion 8 of the cap 5 has a a leading surface 31 and a trailing surface 32. The leading surface 31 is arranged to the flange trailing surface 22 of the body 2 of the fastener 1 when the cap 5 is arranged to the cap receiving portion 16 of the body 2 of the fastener 1. The trailing surface 32 of the cylindrical flange 8 of the cap 5 is arranged opposite the leading surface 31 of the cylindrical flange portion 8 of the body 2 of the fastener 1.

Figure 3A:
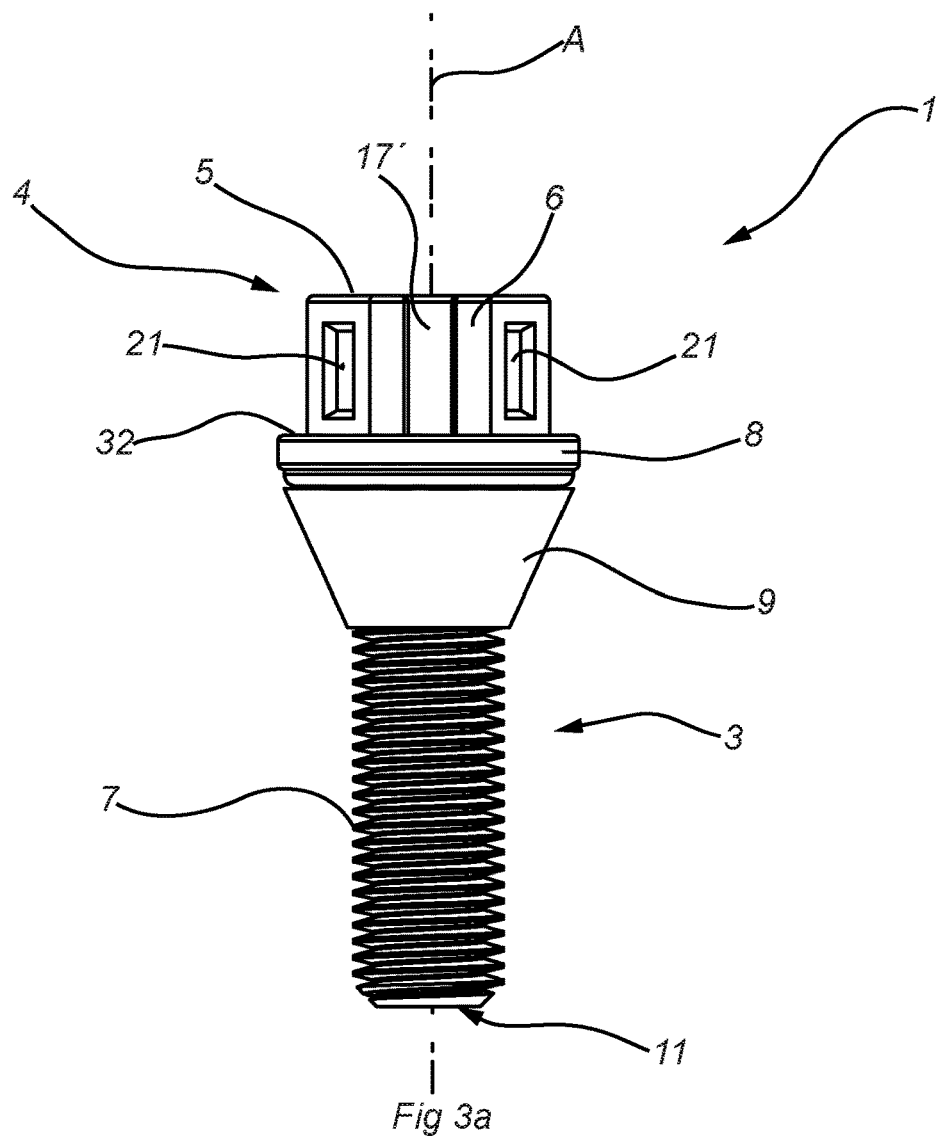
FIGS. 3a-3b show a side view of the fastener in FIG. 1 as well as a top view of the cap.
Figure 3B:
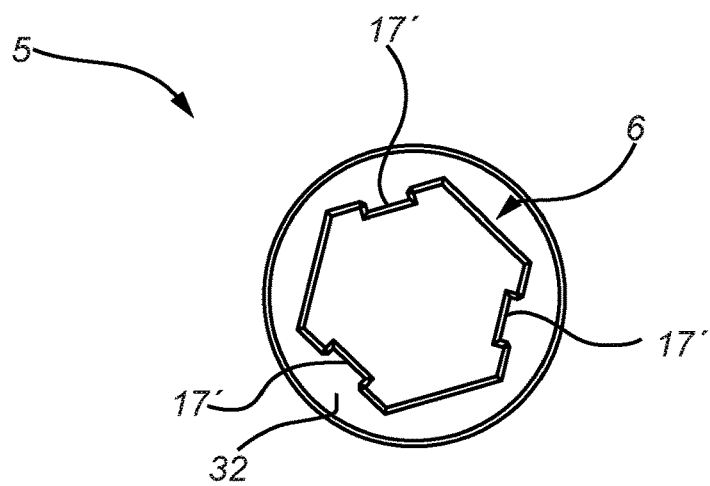

FIG. 3a shows a side view of the fastener in FIG. 1.

FIG. 3b shows a top view of the cap 5 of the fastener 1 prior to being arranged to cover the cap receiving portion 16 of the body 2 of the fastener 1. The figure better shows how the guiding projections 17' are arranged on every other surface of the hexagonal cross-sectional shaped cap 5. Shown is also the tool engaging portion 6 of the fastener 1 which can be engaged with for instance a wrench, or spanner, or a hexagonal socket.

Although the exemplifying embodiment of FIGS. 1-3b is illustrated as having a cap 5 with guiding projections 17' and a cap receiving portion 16 with mating guiding tracks 17, facilitating the mating of the cap 5 to the cap receiving portion 16 of the body 2, these are not essential to the inventive concept. In other exemplifying embodiments, at least one of (or both) of the cap 5 and cap receiving portion 16 lack guiding projections and guiding tracks, respectively. For instance, the cap 5 may thus have all six sides of the hexagonal tool engaging portion 6 in the form of flat or substantially flat surfaces. Although the guiding function is inferior, the subsequent deformation of the cap 5 after mating with the cap receiving portion 16 will still be obtained. Thus, the recess 20 in the cap receiving portion will still act as a counterhold which forms a protrusion 121 in the cap 5 when the cap 5 is pressed inwardly against the cap receiving portion 16.

Furthermore, in other embodiments, one of the guiding track 17 and or guiding projection 17' may have a substantially shorter axial length compared to the other. A guiding function will still be obtained. For instance, in the example in FIGS. 1-3b, the guiding projection 17' could be substantially shorter, such as extending from the leading end of the tool engaging portion 6 and only partway to the trailing end.

It should also be understood that in other embodiments, the guiding tracks may be provided on the cap while the guiding projections are provided on the body. Similarly, in some exemplary embodiments protrusions may be provided on the body, acting as counterhold against which the cap is deformed to form matching recesses.

Figure 4A:
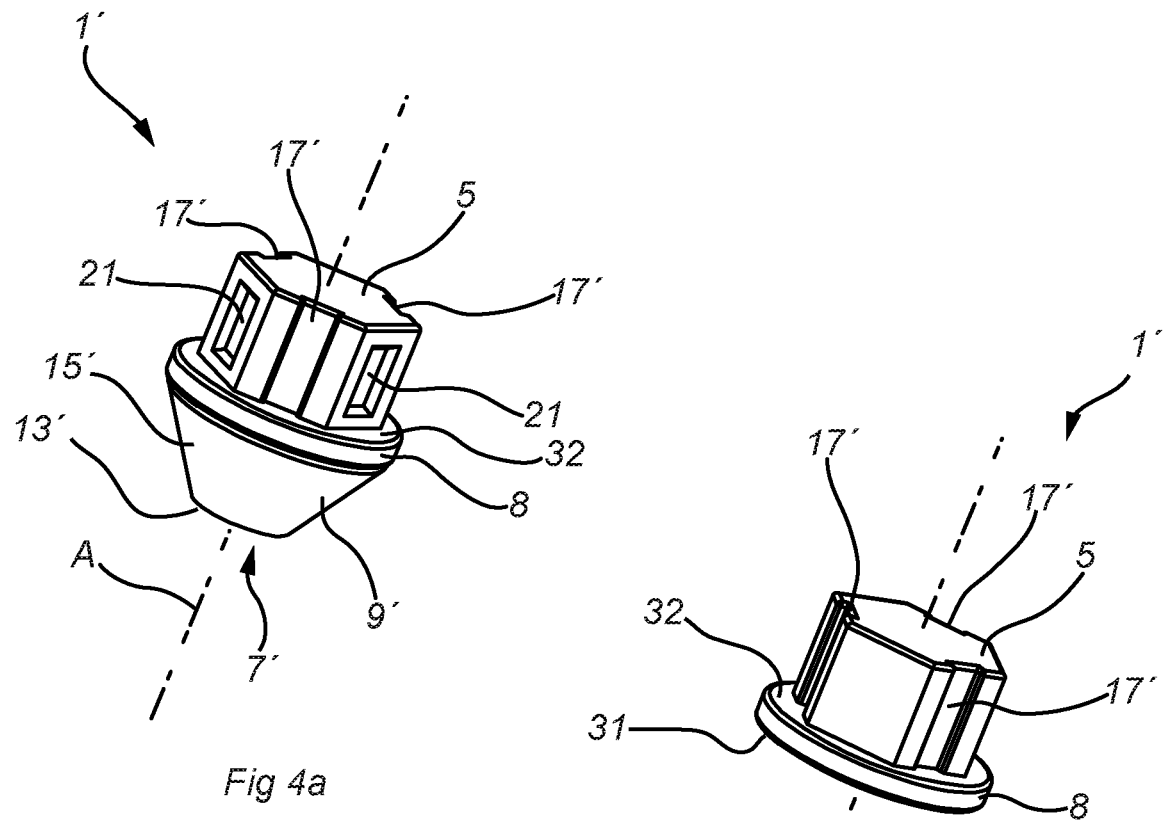
FIG. 4a shows a fastener in the shape of a nut having a body and a cap.
Figure 4B:
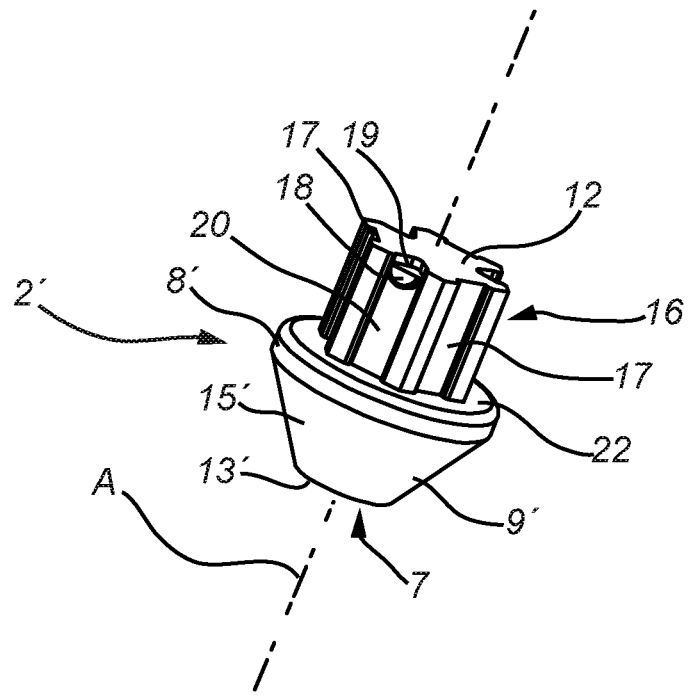

FIGS. 4a-4b show another embodiment of a fastener 1' wherein the fastener 1' is in the shape of a nut, instead of a bolt. The fastener in FIGS. 4a-4b shares in most parts design with the fastener 1 disclosed in FIG. 1-3b. The body 2' of the fastener 1' comprises a cap receiving portion 16 (FIG. 4b) and a conical portion 9'. The cap receiving portion 16 of the body 2' of the fastener 1' is arranged to receive a cap 5. The cap 5 and the cap receiving portion 16 have the same shape and dimensions as the cap 5 in FIGS. 1-3b. The flange 8' forms a part of the conical portion 9' of the body 2' of the fastener 1'.

The body 2' of the fastener 1' comprises an axially extending, internal threaded, blind hole 7' extending from a leading surface 13' of the conical portion 9'. The leading surface 13' of the body of the fastener 1 is arranged to be facing an externally threaded item to which the fastener is to be screwed onto. The conical portion 9' is arranged with an outer surface 15'.

FIG. 4b shows an exploded view of the fastener 1' in FIG. 4a. The cap receiving portion 16 of the fastener in FIG. 4a corresponds to the cap receiving portion 16 of the fastener in FIGS. 1-3 and will not be described again.

Figures 5A, 5B:
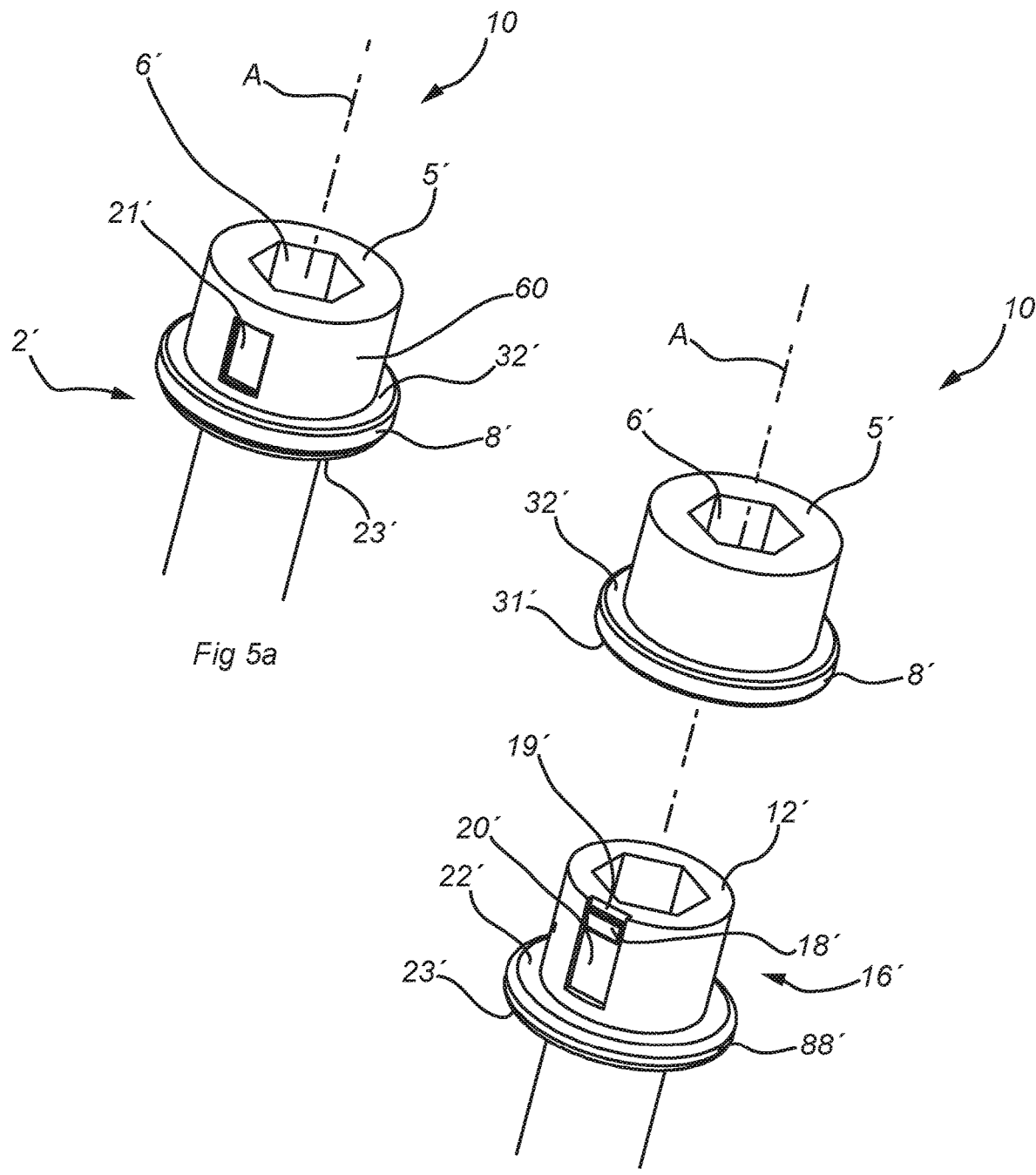
FIGS. 5-6 show alternative fasteners comprising a body and a cap.

FIGS. 5a-5b show an alternative embodiment of a fastener 10, wherein the hexagonal head of the fastener in FIGS. 1-3b, comprising the external tool engaging portion 6, has been replaced with an internal, hexagonal or allen key, tool engaging portion 6'. The fastener 10 comprises a cap 5', arranged to a cap receiving portion 16'. The cap receiving portion 16' comprises a recess 20' arranged to secure the cap 5' to the cap receiving portion 16' of the body 2' of the fastener 10. The recess 20' is arranged on an outer surface of the cap receiving portion 16' of the body 2' of the fastener 10. The recess 20' is defined by a groove extending adjacent a flange 88' longitudinally, along the central axis A in a direction towards the trailing surface 12' of the fastener 10. The end of the groove is arranged with and end stop 18' arranged adjacent the trailing surface 12' of the body 2' of the fastener 10. The fastener is shown having a single recess 20' however the fastener may comprise more recesses 20' for securing the cap 5' to the cap receiving portion 16'. The fastener in FIG. 5a-5b shows that the recesses 20' arranged to secure the cap 5' to the cap receiving portion 16' are arranged on an outer surface 60 being separate from a surface of the tool engaging portion 6' of the fastener.

The idea of having a single recess/protrusion pair, may be implemented in other embodiments as well. Thus, it should be understood that the previously discussed embodiments in FIGS. 1-4b (or the variations thereof also discussed above) may be modified to only include a single recess and single matching protrusion. Likewise, any of the exemplifying embodiments may be provided with two or more pairs of matching recesses/protrusions.

Figure 6A:
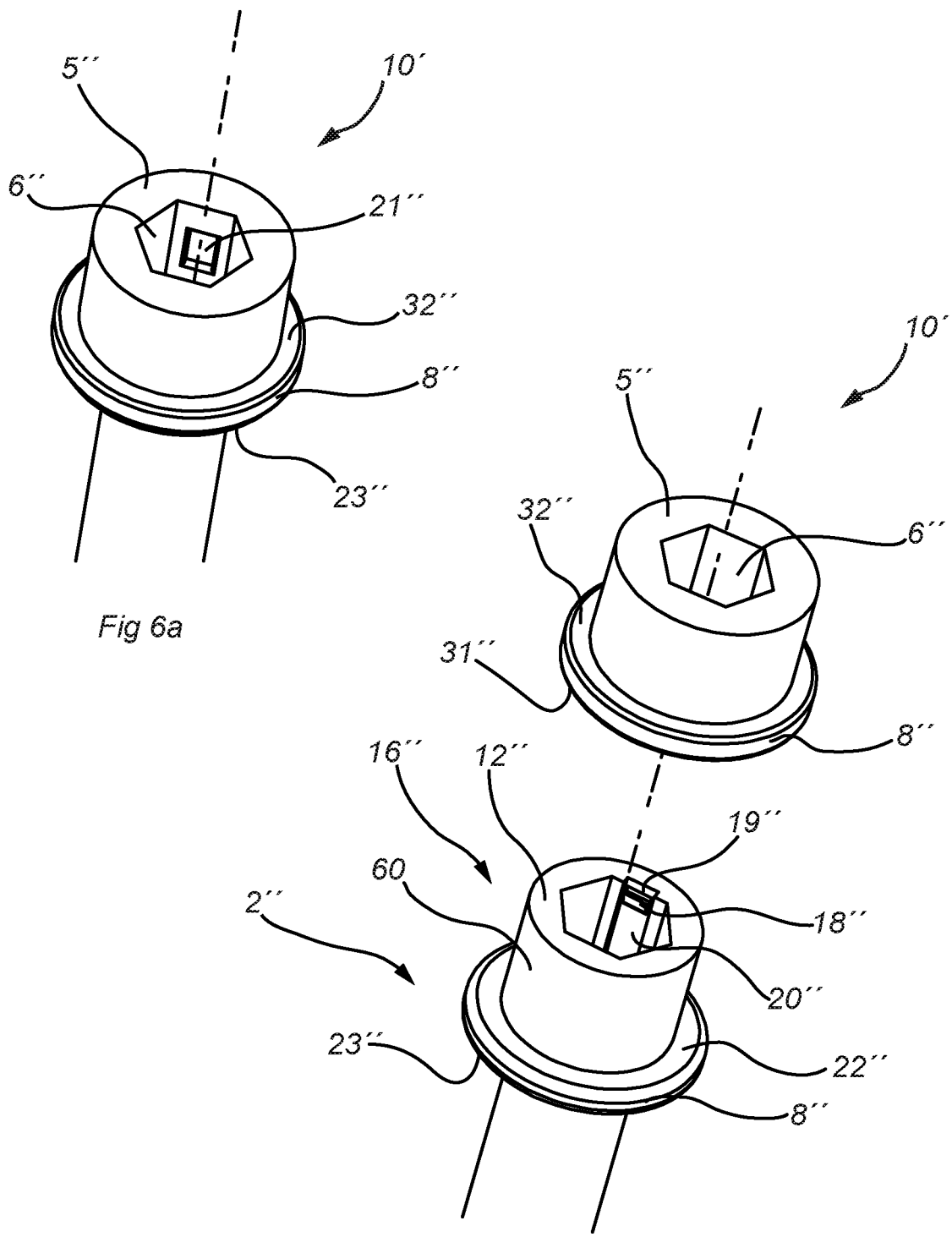

FIGS. 6a-6b shows a fastener 10' comprising a cap 5'' being secured to a cap receiving portion 16'' of the body 2'' of the fastener 10' by a protrusion 21' and a matching a recess 20'' of the cap receiving portion 16'' of the body 2'' of the fastener 10'. The fastener has an internal allen key, or hexagonal, tool engaging portion 6''. The recess 20 and the protrusion 21' is arranged on the internal tool engaging portion 6'' of the body 2'' of the fastener 10'. The fastener 10' is shown having a single protrusion 21' and recess 20' however the fastener may comprise more protrusions 21'' and matching recesses 20''. The cap receiving portion 16'' and the cap 5'' may also be arranged with guiding tracks 17' and matching guiding projections 17 as shown in FIG. 1-3. These may be arranged to the surfaces of the tool engaging portion 6'' of the body 2'' of the fastener 10' or to the outer surface 60' of the body 2'' of the fastener 10'.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A fastener for fastening a wheel to a vehicle, comprising:
   a body comprising: a cap receiving portion, a threaded portion and a central axis, wherein said cap receiving portion has a hexagonal cross-section, in a plane perpendicular to said central axis, and six side surfaces and six edges each having a longitudinal extension parallel to said central axis; and
   a cap, arranged to be received by and cover said cap receiving portion,
   wherein said cap receiving portion comprises a recess against which said cap can be deformed, or has been deformed, such that said cap forms a mutual matching protrusion,
   wherein said recess of said cap receiving portion has a longitudinal extension essentially parallel to said central axis,
   wherein said recess is provided in a side surface of said six side surfaces, between two of said six edges,
   wherein said recess of said cap receiving portion comprises a groove having a longitudinal extension parallel to said central axis and an end stop, said end stop arranged adjacent a trailing surface of said body of said fastener, and wherein the end stop is a protrusion formed in the groove, and wherein the longitudinal extension of the recess is greater than its width.

2. A fastener according to claim 1, wherein one of said cap and said cap receiving portion comprises at least one guiding track and wherein the other of said one of said cap and said cap receiving portion comprises a mating guiding projection.

3. A fastener according to claim 2, wherein said at least one guiding track and said at least one guiding projection has a longitudinal extension, essentially parallel to the central axis.

4. A fastener according to claim 2, wherein said recess and said guiding track or guiding projection are alternately arranged on said cap receiving portion.

5. A fastener according to claim 2, wherein said cap receiving portion comprises the same number of: recesses; and guiding tracks or guiding projections.

6. A fastener according to claim 1, wherein a surface of said cap comprises a tool engaging portion adapted to be engaged by a tool when fastening and loosening said fastener.

7. A fastener according to claim 1, wherein said cap has a hexagonal cross-section, in a plane perpendicular to said central axis.

8. A fastener according to claim 1, wherein said cap is made from a non-corrosive material.

9. A fastener according to claim 8, wherein said cap is made from stainless steel.

10. A fastener according to claim 1, wherein said cap is made from a first material plated by a second material.

11. A fastener according to claim 1, wherein said fastener is an internal socket type fastener and wherein said recess or protrusion, is arranged on an outer surface of said cap.

12. A fastener according to claim 1, wherein the fastener is a bolt or a nut.

13. A method of assembling a fastener, said fastener comprising:
- a body comprising: a cap receiving portion, a threaded portion, a central axis, wherein said cap receiving portion has a hexagonal cross-section, in a plane perpendicular to said central axis, and six side surfaces and six edges each having a longitudinal extension parallel to said central axis; and
- a cap,
- said method of assembling said fastener comprising the steps of:
  - capping said body, by arranging said cap to said cap receiving portion, such that said cap covers said body, and
  - deforming said cap such that said cap forms a protrusion, when the cap receiving portion comprises a recess, so that said formed protrusion matches said recess of said cap receiving portion, wherein said recess of said cap receiving portion has a longitudinal extension parallel to said central axis, wherein said recess is provided in a side surface of said six side surfaces, between two of said six edges, wherein said recess of said cap receiving portion comprises a groove having a longitudinal extension parallel to said central axis and an end stop, said end stop arranged adjacent a trailing surface of said body of said fastener, wherein the end stop is a protrusion formed in the groove, and wherein the longitudinal extension of the recess is greater than its width.

\* \* \* \* \*